United States Patent [19]

Mende et al.

[11] Patent Number: 5,627,639
[45] Date of Patent: May 6, 1997

[54] CODED APERTURE IMAGING SPECTROMETER

[75] Inventors: Stephen B. Mende, Los Altos; Edward S. Claflin, Redwood City, both of Calif.

[73] Assignee: Lockheed Missiles & Space Company, Inc., Sunnyvale, Calif.

[21] Appl. No.: 476,708

[22] Filed: Jun. 6, 1995

[51] Int. Cl.[6] .................................................... G01J 3/04
[52] U.S. Cl. ............................................................ 356/310
[58] Field of Search ................................... 356/325, 326, 356/328, 330–334, 310

[56] References Cited

U.S. PATENT DOCUMENTS

| | | |
|---|---|---|
| 3,720,469 | 3/1973 | Harwit . |
| 4,060,326 | 11/1977 | Tirabassi et al. .................. 356/328 |
| 4,435,838 | 3/1984 | Gourlay . |
| 5,050,989 | 9/1991 | Tassel et al. ...................... 356/310 |

OTHER PUBLICATIONS

Mende et al., "Ultraviolet Imaging Spectrometer for Monitoring High–Latitude Precipitating Patterns", *Optical Engineering*, Dec. 1993, vol. 32, No. 12, pp. 3139–3146.
Mende et al., "Hadamard Spectroscopy With a Two–Dimensional Detecting Array", *Applied Optics*, 1 Dec. 1993, vol. 32, No. 34, pp. 7095–7105.
Sloane et al; "Codes for Multiplex Spectrometry" Applied Optics, vol. 8, No. 10, Oct. 1969, pp. 2103–2106.

*Primary Examiner*—K. Hantis
*Attorney, Agent, or Firm*—Edward B. Weller; Edward J. Radlo

[57] ABSTRACT

An imaging spectrometer that includes a mask (214) that has an array of n rows (302) and n columns (304) of transmissive elements (306) for transmitting the light from a plurality of locations of an image and of opaque elements (308) for blocking light from a plurality of locations of the image. The transmissive and opaque elements are arranged in a Hadamard pattern having rows (and columns) that are different cyclic iterations of an m-sequence. A grating (110) disperses the transmitted light from the transmissive elements (306) in a linear spatial relationship in a predetermined relationship to the wavelength of the transmitted light. A detector array (406) has a plurality of detector elements (408) arranged in a row to receive the dispersed transmitted light from the grating (110). Each detector element (408) provides an intensity signal indicative of the intensity of the light impinging thereon. A computer (410) generates a spectrum matrix having elements indicative of the frequency spectrum of the plurality of locations of the image. The spectrum matrix is produced by matrix multiplication of an inverse mask pattern matrix and a data matrix. Each element of the mask pattern matrix is either a 0 for opaque elements (308) or a 1 for transmissive elements (306). The inverse mask pattern matrix is generated by replacing each 0 of the pattern by −1, taking the transpose, and multiplying by 2/(n+1). Each row of the data matrix represents data taken from the same location of the image and through a corresponding row of the mask (214).

6 Claims, 8 Drawing Sheets

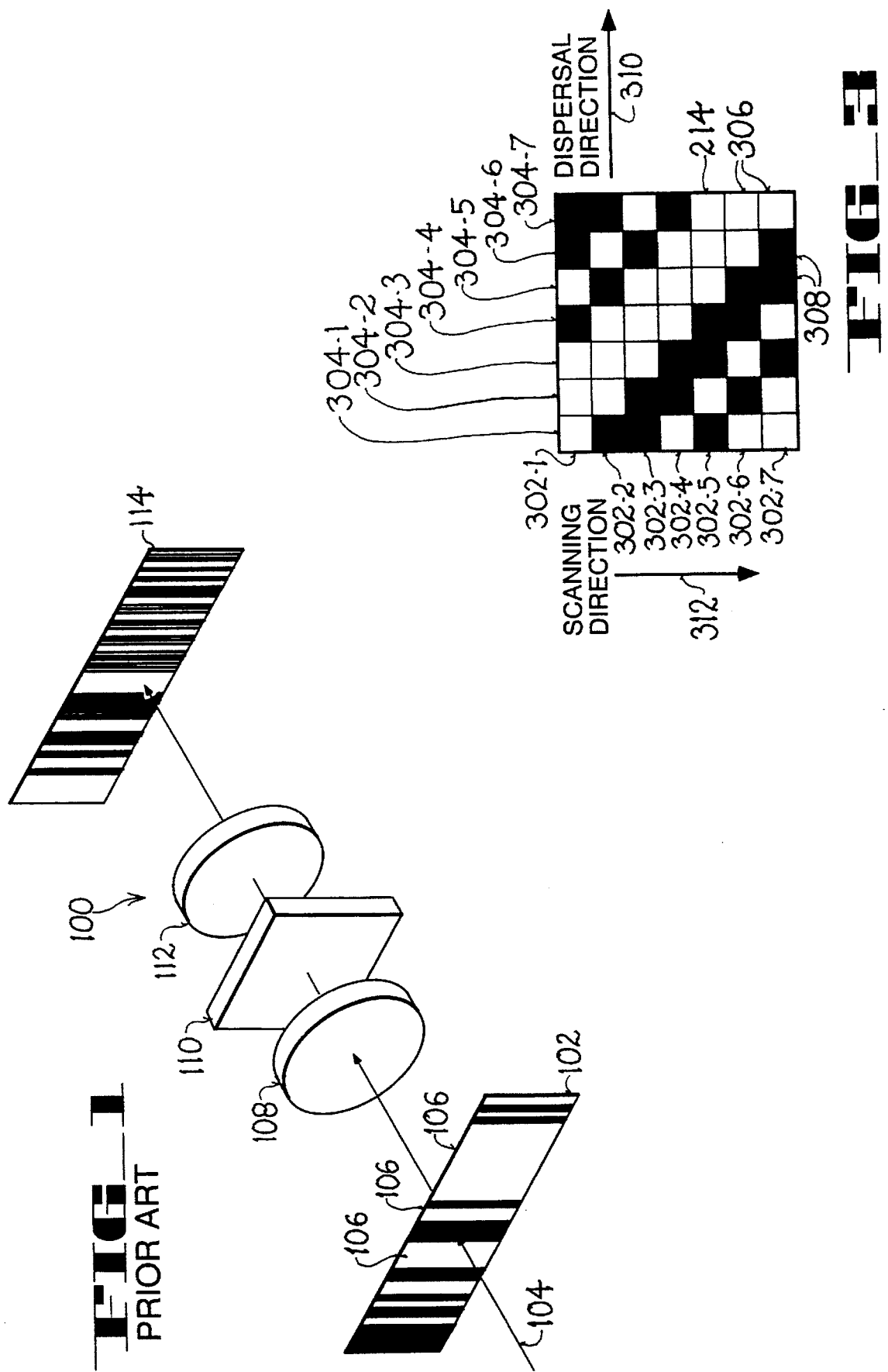

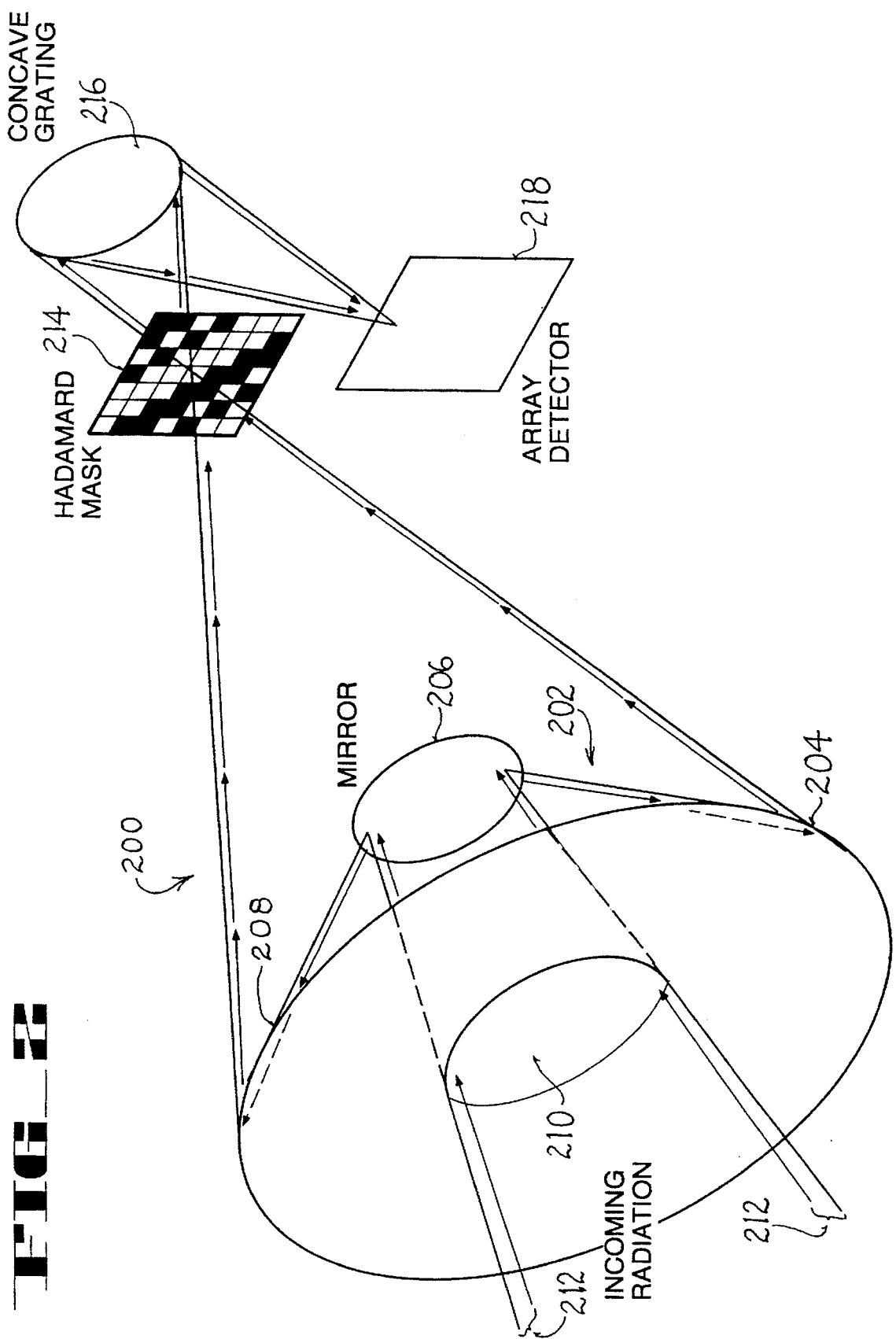

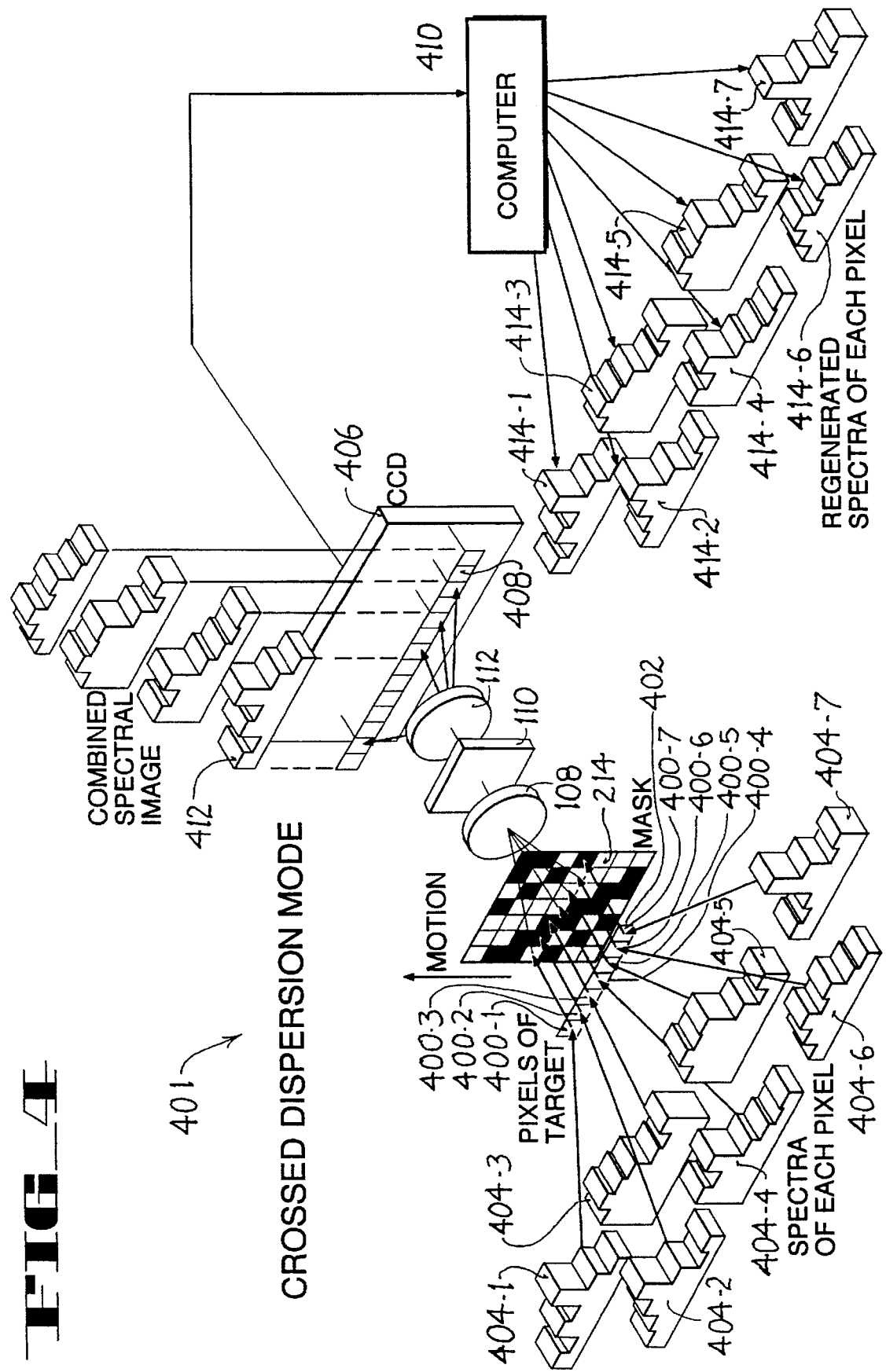
FIG_4

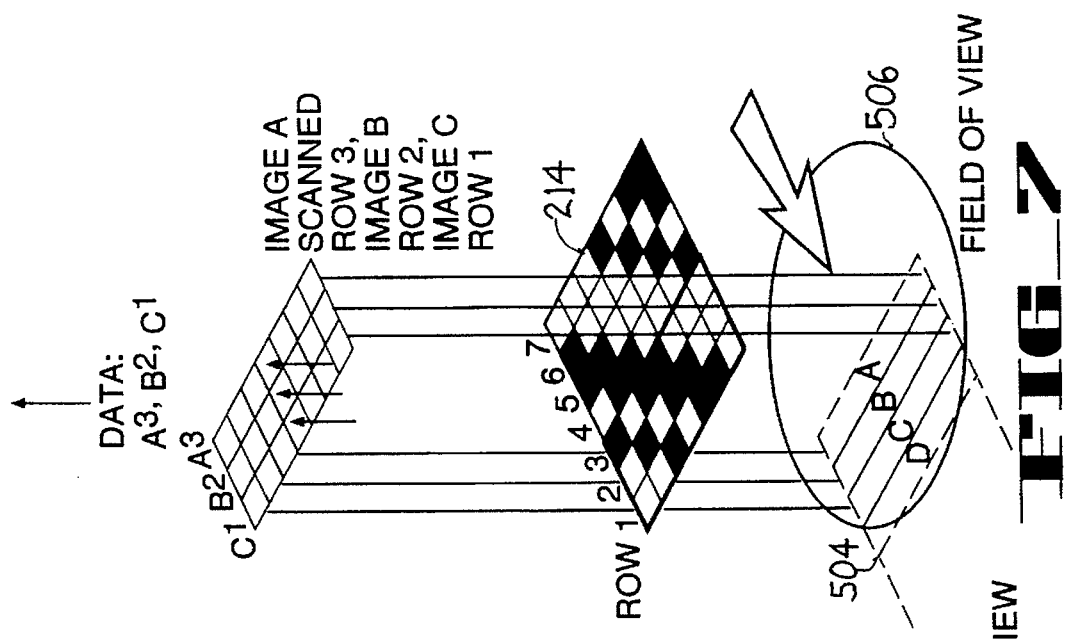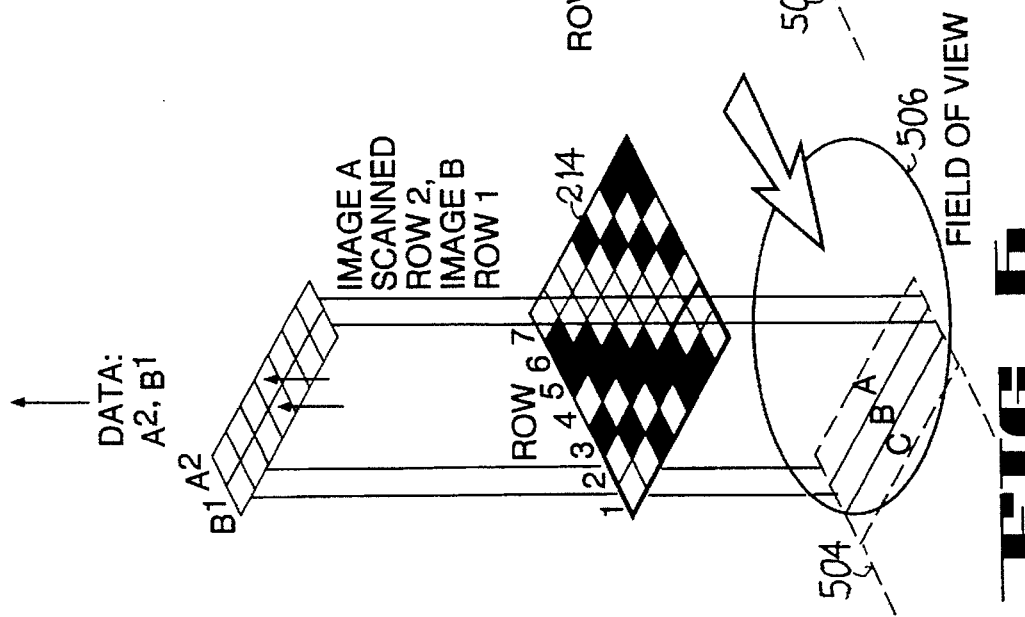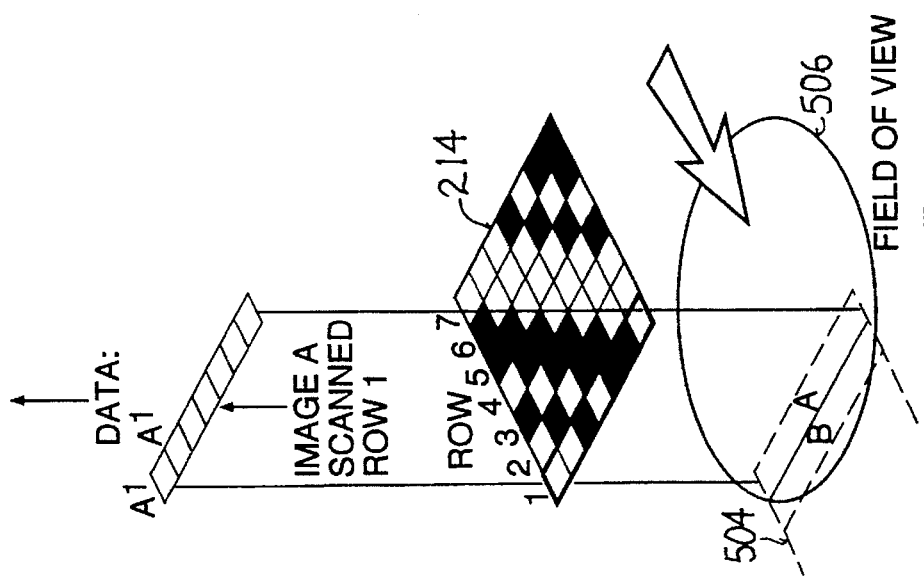

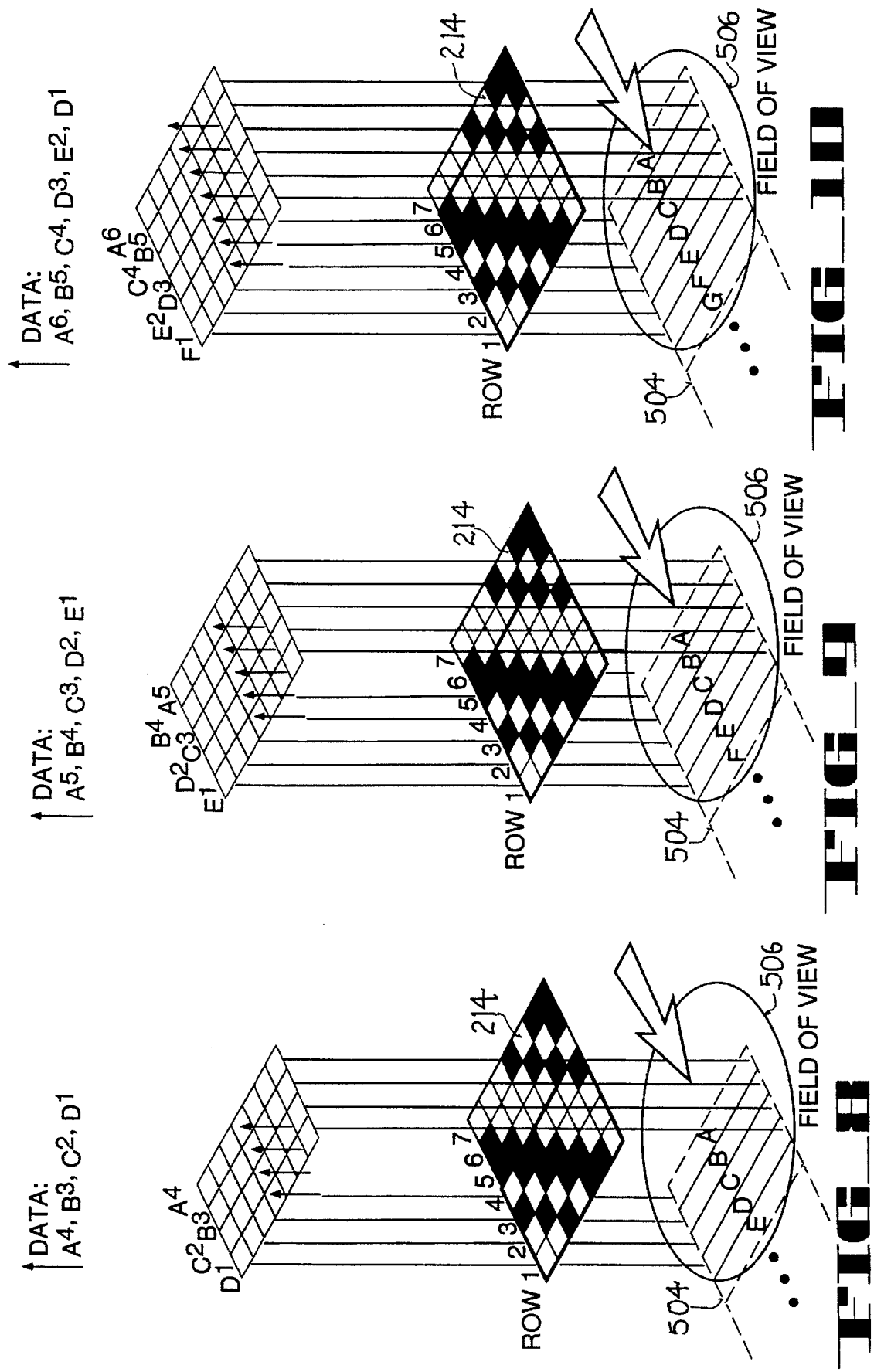

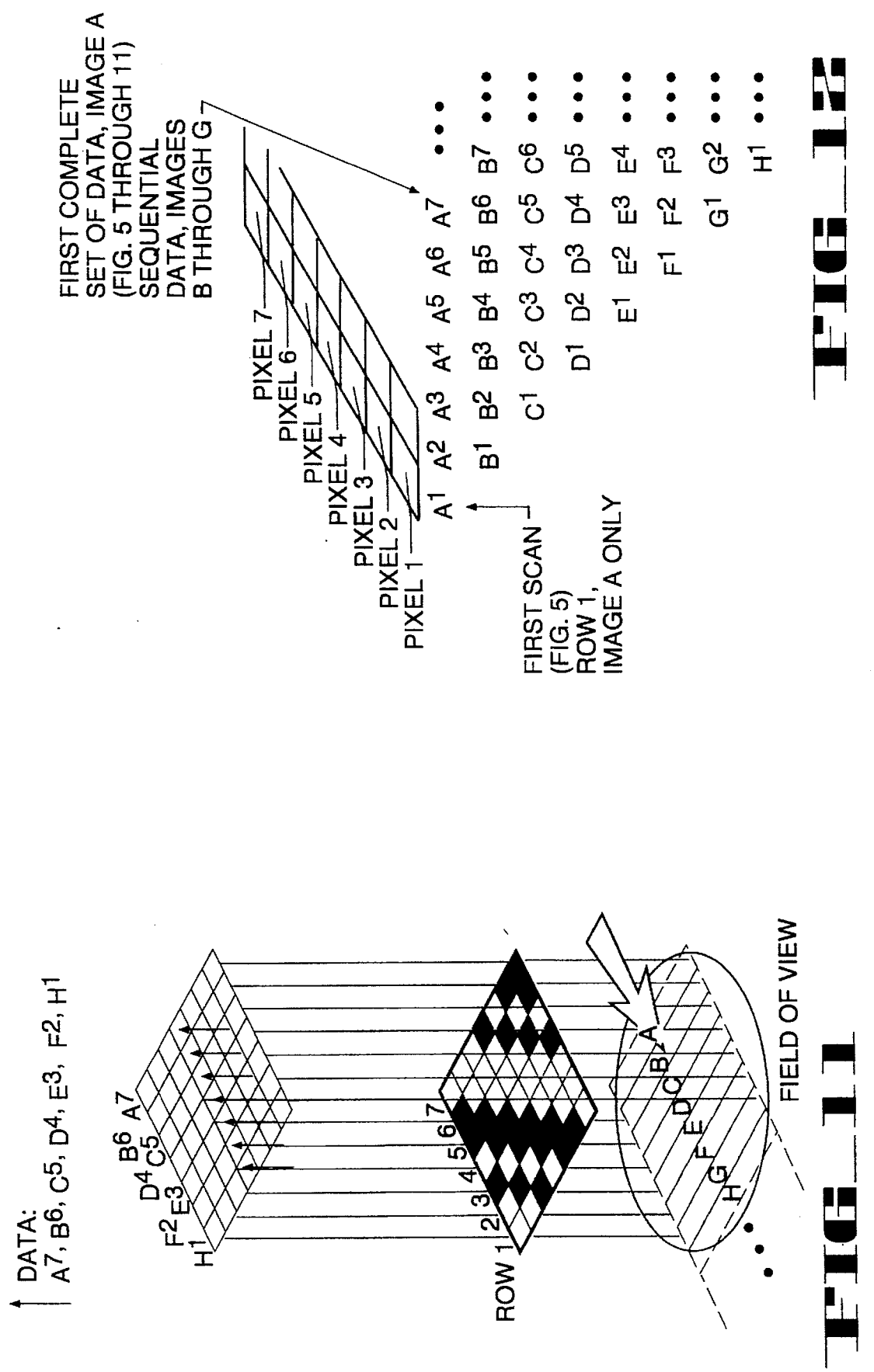

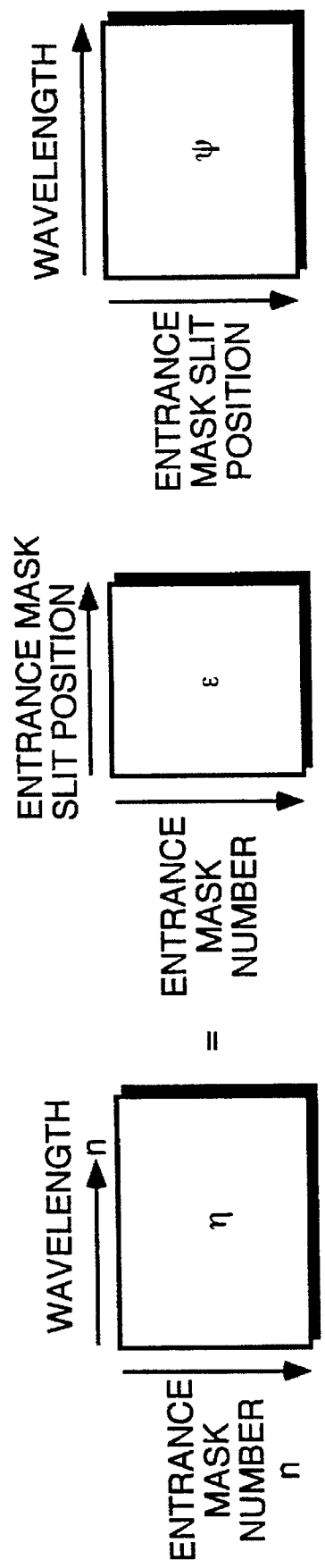

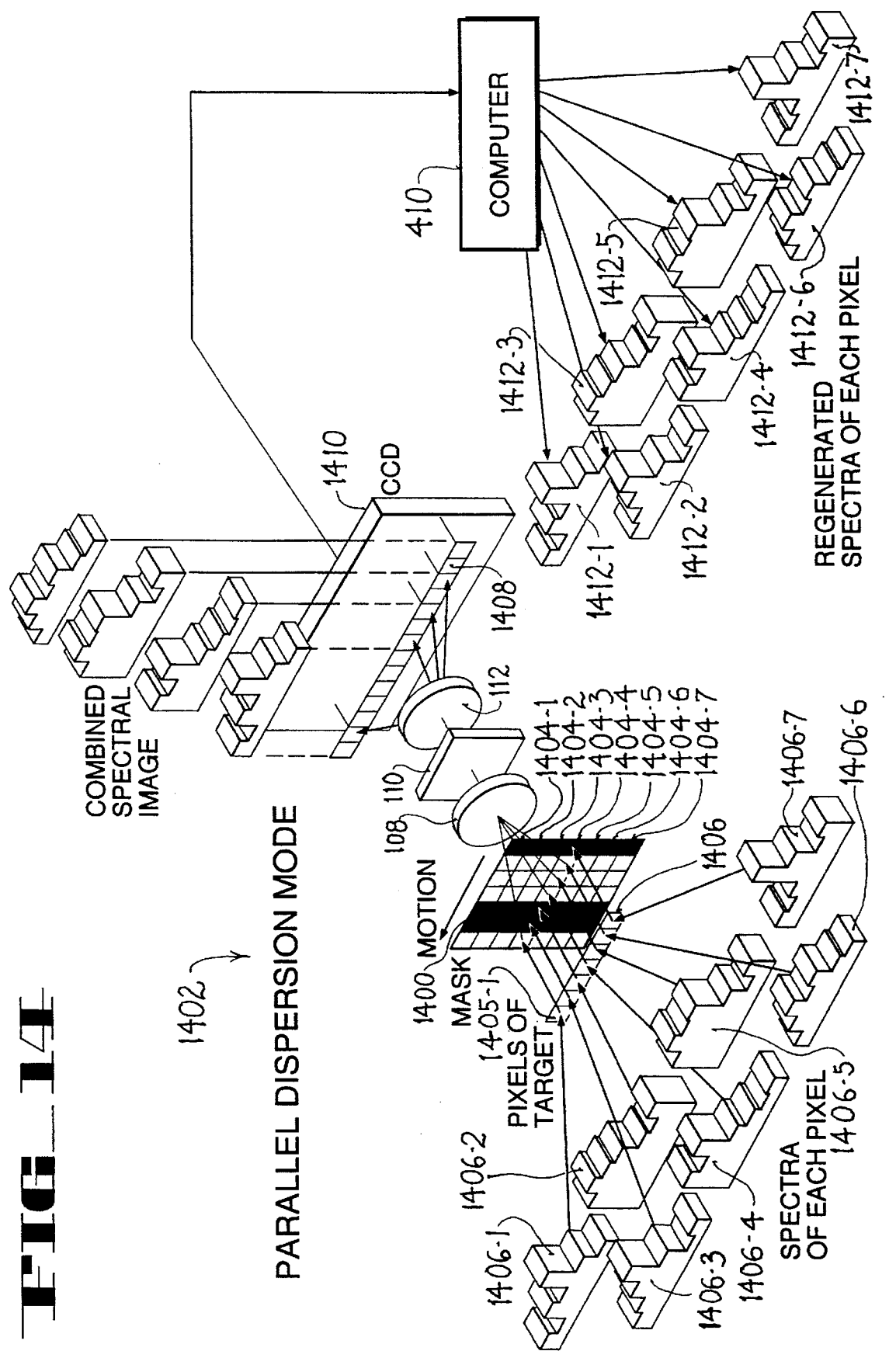

CODED APERTURE IMAGING SPECTROMETER

FIELD OF THE INVENTION

This invention relates to imaging in multiple spectral bands, and more particularly to imaging spectroscopy using a coded aperture Hadamard mask.

BACKGROUND OF THE INVENTION

In image detection and analysis, it is desired to determine the frequency or wavelength spectrum of the light in addition to the total intensity from the image at different points on the image. In a first method, the light from an image is transmitted to a plurality of imagers (cameras). Each imager has a filter at a wavelength passband offset from the passband of the other filters and a detector for measuring the intensity of the filtered light. This method provides both simultaneous spatial and time wavelength distributions of the image. Although this method is simple, it is also cumbersome requiring many imagers and filters and it is not always possible to use it. For example, filters may not be available for some spectral regions. As another example, where filters are available, the filters may be limited in their transmissive or spectral discrimination properties.

In a second method, the light from the image is successively transmitted through a sequence of filters to a single imager. As with the first method, each filter has a passband offset from the passband of the other filters. Such a method provides a simultaneous spatial distribution of the image at the wavelength of the passband of each filter and a time sequence of the wavelength distribution by changing the filters. Unlike the first method, this method does not provide a simultaneous wavelength distribution of the image. Moreover, the system has dead time between measurements while the filters are being changed. Another disadvantage is that the rapid changing of filters requires a complex mechanical system, such as a filter wheel.

In a third method, a spectrometer has an entrance slit for passing a portion of an image, which is then dispersed into a spectrum by a grating or the like. An exit slit passes a portion of the dispersed light, which covers a narrow range of wavelengths, onto a detector for measuring the intensity of the light of this wavelength range. This method requires that the exit mask be moved relative to the detector to obtain a wavelength distribution of the image and that the spectrometer be moved relative to the image to obtain a spatial distribution of the image. For high spectral resolution, the spectrometer uses narrow entrance slits. Because the slits are small apertures, they limit the amount of light received at a detector. In other words, the light throughput, which is the product of the area of the input aperture multiplied by the angular divergence of the light rays being collected by the spectrometer, is strictly limited. Consequently, the noise of the detectors limits the measurable intensity of the dispersed light.

SUMMARY OF THE INVENTION

The present invention includes an imaging spectrometer (401) mounted on a uniformly moving platform such as an aircraft or a space satellite, that includes a coded aperture or mask (214) that has an array of n rows (302) and n columns (304) of transmissive elements (306) for transmitting the light from a plurality of locations of an image and of opaque elements (308) for blocking the Light from a plurality of locations of the image. The transmissive elements (306) and the opaque elements (308) are arranged in a Hadamard pattern having rows (and columns) that are different cyclic iterations of an m-sequence. A grating (110) disperses the transmitted light from the transmissive elements (306) in a linear spatial relationship and in a predetermined relationship to the wavelength of the transmitted light.

A detector array (406) has a plurality of detector elements (408) arranged in a row to receive the dispersed transmitted light from the grating (110). Each detector element (408) provides an intensity signal indicative of the intensity of the light impinging thereon. A computer (410) generates a spectrum matrix having elements indicative of the frequency spectrum of the plurality of locations of the image. The spectrum matrix is produced by matrix multiplication of an inverse mask pattern matrix and a data matrix. Each element of the mask pattern matrix is either a 0 for opaque elements (308) or a 1 for transmissive elements (306). The inverse mask pattern matrix is generated by replacing each 0 of the pattern by −1, taking the transpose, and multiplying by 2/(n+1). Each row of the data matrix represents data taken from the same location of the image and through a corresponding row of the mask (214).

A method determines the light spectra of a plurality of locations of an image using a spectrometer (401). A mask (214) having an array of n rows (302) and n columns (304) of transmissive elements (306) for transmitting the light from a plurality of locations of an image and opaque elements (308) for blocking the light from a plurality of locations of the image arranged in a Hadamard pattern is provided. The elements of each row (302) are arranged in a different cyclic iteration of an m-sequence. A grating (110) is provided for dispersing the transmitted light from the transmissive elements (306) in a linear spatial relationship in a predetermined relationship to the wavelength of the transmitted light. A detector array (406) having a plurality of detector elements (408) arranged in a row is provided. Each detector element (408) provides an intensity signal indicative of the intensity of the light from the grating (110) impinging thereon.

In the method, light from the image impinges onto a first row (304) of the mask (214). The dispersed light through the mask (214) is detected. The mask (214) is translated relative to the target (402) in a direction transverse to the row (302). The impinging, detecting, and translating steps are repeated until the dispersed light is detected for each row (302) of the mask (214). A data matrix is generated from the detected light for each row (302) of the mask (214). The data matrix and the inverted mask pattern matrix are matrix multiplied to generate a spectrum matrix.

DESCRIPTION OF THE DRAWINGS

FIG. 1 is a perspective view illustrating a conventional non-imaging coded aperture spectrometer 100.

FIG. 2 is a perspective view illustrating an imaging spectrometer 200 suitable for operation in the ultra violet in accordance with the present invention.

FIG. 3 is a schematic view illustrating a 7 by 7 element mask 214 of the imaging spectrometer 200 of FIG. 2.

FIG. 4 is a schematic view illustrating the dispersion of the spectra of an image through the mask 214 and the reconstruction of the detected spectra in a crossed dispersion mode.

FIGS. 5–11 are successive schematic views of data elements from the dispersion of images A–G through the mask 214 as the mask 214 is translated.

FIG. 12 is a graphical representation of the data set for a complete data set for an image A and for partial data sets for images B–G as shown in FIGS. 5–11.

FIG. 13 is a pictorial diagram illustrating the transfer function of the mask 214 of FIG. 3.

FIG. 14 is a schematic view illustrating the dispersion of the spectra of the image through the mask 214 and the detection and processing of the detected spectra in a parallel dispersion mode.

DETAILED DESCRIPTION OF THE PREFERRED EMBODIMENTS

Referring to FIG. 1, there is shown a perspective view illustrating a conventional non-imaging coded aperture imaging spectrometer 100. A mask 102 receives light 104 from a light source (not shown) and selectively passes the light 104 through a plurality of slits 106 to a collimating lens 108 which refracts the light 104 into parallel rays. A grating 110 disperses the spectral components of the light 104 into a linear spatial distribution as a function of the wavelength of the light. A focusing lens 112 focuses the dispersed lighted onto a detector 114 for measuring the intensity of the spectral components of the light 104. Such a spectrometer can measure the spectral content of the light 104 illuminating the coded aperture 106 by deconvolving the complex light distribution falling on the imaging detector 114. Such spectrometer is non-imaging and for proper operation it also requires that the illumination on the coded aperture has to be spectrally uniform and that its spatial intensity distribution has to be known. Such a spectrometer has advantages over a single slit spectrometer because of the increase in light gathering power by virtue of the multiple slits 106.

Referring to FIG. 2, there is shown a perspective view illustrating a special configuration of an imaging spectrometer 200 in accordance with the present invention. In this configuration, suitable for ultraviolet wavelength range, there are no transmissive optical components and all image forming and dispersion is accomplished by reflective optics. In general, however, conventional refractive lenses and transmissive elements can be used for visible light. There has to be a lens to produce a simple image on the mask. Following that, there is a collimating lens 108, a grating 110, and an image forming lens 112 to produce a final image on a detector. In this configuration, an inverse cassegrain telescope 202 includes a concave mirror 204 and a convex mirror 206 for producing an image on a mask. The concave mirror 204 has a mirrored concave surface 208 and has an aperture 210 for passing incoming light 212 from a target (not shown). The light 212 may be, for example, ultraviolet, visible light, or infrared. The convex mirror 206 receives the passed incoming light 212 and reflects such light onto the mirrored surface 208 of the concave mirror 204. The concave mirror 204 reflects and focuses the light onto an encoding mask 214 disposed in a focal plane of the concave mirror 204.

The encoding mask 214, described later herein, selectively passes the light to impinge on a concave grating 216. The concave grating 216 spatially and spectrally separates the light into its spectral components, which are dispersed at an angle to the impinging light and in a predetermined linear relationship to the wavelength of the spectral component. The concave grating 216 focuses the dispersed light onto an array detector 218, described later herein, which measures the intensity of the dispersed light.

Referring to FIG. 3, there is shown a schematic view illustrating the mask 214. The mask 214 has an array of rows 302-1 through 302-n and of columns 304-1 through 304-n of transmissive elements 306 for passing light and opaque elements 308 for blocking light. For exemplary purposes, the mask 214 shown in FIG. 3 has seven rows and seven columns. Each transmissive element 306 is a slit for allowing the transmission of radiation. For clarity, the transmissive elements 306 are shown as white squares and opaque elements 308 are shown as black squares. The transmissive elements 306 and the opaque elements 308 are arranged preferably in a Hadamard pattern. Hadamard patterns are described in M. Harwit and N. J. A. Sloane, *Hadamard Transform Optics*, Academic, New York (1979), the subject matter of which is incorporated herein by reference. Each row 302 of the mask 214 is arranged in an m-sequence cyclic pattern in which the transmissive elements 306 and the opaque elements 308 of the previous row 302 are shifted by one column 304 and the last element is moved to the first column. Here, m equals 7. Because the pattern is a cyclic pattern, a mask matrix $\epsilon$, described later herein, is orthogonal. Because it has an equal number of rows and columns, the mask 214 has a shifting pattern.

A dispersal direction 310 of the light is in the axis of the columns 304. A scanning direction 312 of the translation of the mask 214 relative to the target is in the axis of the rows 302.

Referring to FIG. 4, there is shown a schematic view illustrating the dispersion and reconstruction of the spectrum of each pixel 400 of a target 402 in a crossed dispersion mode in a spectrometer 401. Each pixel 400-1 through 400-7 of the target 402 has a respective spectrum 404-1 through 404-7 of the light reflected from the pixel 400. Alternatively, the spectra 404 may be of light generated by the pixel 400. A focusing lens or mirror (not shown for clarity), disposed between the target 402 and the mask 214 projects an image of the target 402 onto the mask 214. The light from each pixel 400 impinges on a corresponding element of the mask 214. For clarity, the spectrometer of FIG. 4 uses a collimating lens 108, a grating 110, and a focusing lens 112 for dispersing the light. Alternatively, a concave reflective diffraction grating 216 may be used. The light passes through the transmissive elements 306 of the mask 214, the collimating lens 108, the grating 110, and the focusing lens 112 onto a detector array 406 having rows of detector elements 408. For clarity, only one row of detector elements 408 is shown. The dispersed light associated with each transmissive element 306 of the mask 214 impinges the detector elements 408. Each detector element 408 receives a different range of wavelengths of the dispersed light from each transmissive element 306 of the mask 214. Each detector element 408 measures the intensity of the combined signal of the dispersed light from one or more pixels 400. Each detector element 408 provides a signal indicative of the measured intensity to a computer 410 for generating spectra 414-1 through 414-7 indicative of the spectra 404-1 through 404-7 of each pixel 400 as described later herein in conjunction with FIG. 13. The detector elements 408 may be, for example, charge coupled devices (CCD).

As the mask 214 is translated relative to the target 402, the light from the target 402 passes through successive rows 302 of the mask 214 and is correspondingly measured by the detector array 406. After the target 402 passes through every row 302 of the mask 214, the computer 410 generates the spectra 414-1 through 414-7 of the respective pixel 400-1 through 400-7, as described later herein.

Referring to FIGS. 5–11, there are shown schematic views illustrating a moving spectrometer system 500 for taking successive measurements of rows of a target 504. The spectrometer 500 has a field of view 506 that moves across the target 504 which comprises a plurality of rows. For illustrative purposes, only rows A through H are shown.

Referring in particular to FIG. 5, the first row A of the target 504 is completely in the field of view 506. The image $A^1$ of row A is projected onto the row 302-1 of the mask 214 which disperses the image onto row 1 of the detector array (not shown). Responsive to the image, the detector array measures a set of data $A^1$ corresponding to the intensity of the dispersed light from the row 302-1 of the detector array. The data is provided to the computer 410 for processing, described later herein.

Referring in particular to FIG. 6, the field of view 506 is moved so that rows A and B of the target 504 are completely in the field of view 506. The image of rows A and B are projected onto respective rows 302-1 and 302-2 of the mask 214 which disperses the image onto rows 1 and 2 of the detector array. Responsive to the image, the detector array measures sets of data $A^2$ and $B^1$ corresponding to the intensity of the dispersed light from rows A and B of the target 504 and provides such data to the computer 410.

Referring in particular to FIG. 7, the field of view 506 is moved so that rows A, B and C of the target 504 are completely in the field of view 506. The image of rows A, B, and C are projected onto respective rows 302-1 through 302-3 of the mask 214 which disperses the image onto rows 1 through 3 of the detector array. Responsive to the image, the detector array measures sets of data $A^3$, $B^2$, $C^1$ corresponding to the intensity of the dispersed light from rows A, B, and C of the target 504 and provides such data to the computer 410.

Referring in particular to FIG. 8, the field of view 506 is moved so that rows A, B, C and D of the target 504 are completely in the field of view 506. The image of rows A, B, C, and D are projected onto respective rows 302-1 through 302-4 of the mask 214 which disperses the image onto rows 1 through 4 of the detector array. Responsive to the image, the detector array measures sets of data $A^4$, $B^3$, $C^2$, $D^1$ corresponding to the intensity of the dispersed light from rows A, B, C, and D of the target 504 and provides such data to the computer 410.

Referring in particular to FIG. 9, the field of view 506 is moved so that rows A, B, C, D, and E of the target 504 are completely in the field of view 506. The image of rows A, B, C, D, and E are projected onto respective rows 302-1 through 302-5 of the mask 214 which disperses the image onto rows 1 through 4 of the detector array. Responsive to the image, the detector array measures sets of data $A^5$, $B^4$, $C^3$, $D^2$, $E^1$ corresponding to the intensity of the dispersed light from rows A, B, C, D, and E of the target 504 and provides such data to the computer 410.

Referring in particular to FIG. 10, the field of view 506 is moved so that rows A, B, C, D, E, and F of the target 504 are completely in the field of view 506. The image of rows A, B, C, D, E, and F are projected onto respective rows 302-1 through 302-6 of the mask 214 which disperses the image onto rows 1 through 6 of the detector array. Responsive to the image, the detector array measures sets of data $A^6$, $B^5$, $C^4$, $D^3$, $E^2$, $F^1$ corresponding to the intensity of the dispersed light from rows A, B, C, D, E, and F of the target 504 and provides such data to the computer 410.

Referring in particular to FIG. 11, the field of view 506 is moved so that rows A, B, C, D, E, F, and G of the target 504 are completely in the field of view 506. Row H of the target 504 is partially in the field of view 506. The image of rows A, B, C, D, E, F, and G are projected onto respective rows 302-1 through 302-7 of the mask 214 which disperses the image onto rows 1 through 7 of the detector array. Responsive to the image, the detector array measures sets of data $A^7$, $B^6$, $C^5$, $D^4$, $E^3$, $F^2$, $G^1$ corresponding to the intensity of the dispersed light from rows A, B, C, D, E, F, and G of the target 504 and provides such data to the computer 410.

Referring to FIG. 12, there is shown a graphical representation illustrating the data set for a complete data set for an image A and for partial data sets for images B–G as shown in FIGS. 5–11. From the orientation of the spectrometer shown in FIG. 5, the detector array receives the image ($A^1$) of row A of the target 402 in the first scan. From the orientation of FIG. 6, the detector array receives the images of ($A^2$) and ($B^1$) in the second scan. From the orientation of the spectrometer shown in FIG. 7, the detector array receives the images $A^3$, $B^2$, $C^1$ in the third scan. From the orientation of the spectrometer shown in FIG. 8, the detector array receives the images $A^4$, $B^3$, $C^2$, $D^1$ in the fourth scan. From the orientation of the spectrometer shown in FIG. 9, the detector array receives the images $A^5$, $B^4$, $C^3$, $D^2$, $E^1$ in the fifth scan. From the orientation of the spectrometer shown in FIG. 10, the detector array receives the images $A^6$, $B^5$, $C^4$, $D^3$, $E^2$, $F^1$ in the sixth scan. From the orientation of the spectrometer shown in FIG. 11, the detector array receives the images $A^7$, $B^6$, $C^5$, $D^4$, $E^3$, $F^2$, $G^1$ in the seventh scan to provide a complete set of data $A^1$ through $A^7$ for processing image A. The computer 410 may now generate the spectra 414-1 through 414-7 for the respective pixels 400-1 through 400-7 of row A of the target 504. In the eighth scan (not shown), the detector array provides a complete set of data $B^2$ through $B^8$. Subsequent scans provide complete sets of data from subsequent rows of the target.

Referring to FIG. 13, there is shown a pictorial diagram illustrating a transfer function of the mask 214 and the indexing of the spectrum, the mask pattern, and data matrices. The spectrum of the target is represented mathematically as a spectrum matrix $\Psi$. Each row of the spectrum matrix represents the spectrum of one slit. Lines of constant wavelength are on diagonals of the spectrum matrix because the slits occupy adjacent rather than overlapping positions. The mask is represented mathematically as a mask pattern matrix $\epsilon$ where an element having a value of 0 represents an opaque element 308 and an element having a value of 1 represents a transmissive element 306. The measured data is represented mathematically as a data matrix $\eta$. Each row of the data matrix represents data measured by the same source elements but transmitted through different rows of the encoding mask 214. In other words, rows from frames of actual data measured at different times are rearranged in proper sequence to form the data matrix. The matrix equation for the encoding by the spectrometer is $$\eta = \epsilon \Psi \quad (1)$$

The computer 410 generates the data matrix $\eta$ using the measurements from the detector array. The computer 410 calculates the spectrum matrix $\Psi$ using the relationship $$\Psi = \epsilon^{-1} \eta \quad (2)$$

where $$\epsilon^{-1} = \frac{1}{n_o} \epsilon'^T \quad (3)$$

and $$n_o = (n+1)/2 \quad (4)$$

The factor $n_o$ is the number of open slits in an n element mask sequence. The matrix $\epsilon'$ is the mask matrix $\epsilon$ except that each "0" entry is replaced by a "–1" entry.

Referring to FIG. 14, there is shown a schematic view illustrating the dispersion of the spectra of the image through a mask 1400 and the detection and processing of the detected spectra in a parallel dispersion mode. A spectrometer 1402 is similar to the spectrometer shown in FIG. 4 except for the mask 1400. The mask 1400 has the transmissive elements 306 and opaque elements 308 in rows 1404-1 through 1404-i that are preferably arranged in a Hadamard pattern. The mask 1400 has i rows 1404. All rows 1404 are identical. Because the elements 406, 408 of the mask 1400 are not cycled, the mask 1400 is not limited to n rows. Although FIG. 14 shows n=i=7, the number of rows i may be based on the width of a target 1406 being imaged.

As the spectrometer 1402 is translated relative to the target, the light from each pixel 1405-1 through 1405-7 of the target 1406 is filtered by the mask 1400 and then diffracted into its respective spectra 1406-1 through 1406-7 by the grating 110. For clarity, only 7 pixels of the target 1406 are shown. The spectra from each pixel impinges a plurality of detector elements 1408 in a detector array 1410. For clarity, only one row of detector elements 1408 is shown. The detector array 1410 preferably has as many rows of detector elements 1408 as the number of rows in the mask 1400. The detector elements 1408 may be, for example, charge coupled devices (CCD). Consequently, each detector 1408 is impinged by a portion of the spectra 1406 from the plurality of pixels 1405 in a corresponding row 1404 of the target 1406. (In contrast, in the system of FIG. 4, each row of detectors is impinged by the spectra of the successive portions of the target. However, the determination of the target spectra is calculated from the spectra of the same portion of the target but taken through different portions of the mask). Here, the sampling is done along a strip of the target 1406 of which only one is shown in FIG. 14. The spectra of the strip is convolved by the computer 410 to generate a spectra 1412-1 through 1412-7. The spatial resolution in the direction of translation is greater with a greater spectral resolution.

For pixels 1405 at the ends of the target 1406, the spectra 1412 is less representative of the respective spectra 1406 because of the lack of samples of these pixels.

The spectrometers 200, 401, and 1402 may be mounted on a platform, such as an aircraft or a satellite, and translated relative to the target. Alternatively, the target may be moved relative to the spectrometer.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

We claim:

1. An imaging spectrometer comprising: a mask having an array of n rows and n columns of transmissive elements for transmitting light from a plurality of locations of a target, and of opaque elements for blocking light from the plurality of locations of the target, the elements of each row arranged in a Hadamard pattern and each row having a different cyclic iteration of an m-sequence;

a grating for dispersing the transmitted light from the transmissive elements in a linear spatial relationship in a predetermined relationship to the wavelength of the transmitted light; and a detector array having a plurality of detector elements arranged in rows and columns, each row of the detector array being arranged to receive the dispersed transmitted light from the grating corresponding to the transmitted light through a row of the mask, each detector element being arranged to receive a different range of wavelengths of the dispersed light from each transmissive element of the corresponding row of the mask and providing an intensity signal indicative of the intensity of the light impinging thereon.

2. The imaging spectrometer of claim 1 further comprising:

a computer having inputs for receiving the intensity signals from the detector array and an output for providing a spectrum matrix having elements indicative of the frequency spectrum of each of the plurality of locations of the target, the spectrum matrix being a matrix multiplication of an inverted mask matrix and a data matrix, the inverted mask pattern matrix being the transpose of the mask pattern matrix multiplied by 2/(n+1), each element of the mask pattern matrix being a 0 for opaque elements or a 1 for transmissive elements, the inverted mask pattern matrix having each 0 of the pattern matrix replaced by −1, and each row of the data matrix representing data taken from the same location of the target and through a corresponding row of the mask.

3. The imaging spectrometer of claim 1 wherein the mask is translatable relative to the target.

4. The imaging spectrometer of claim 1 further comprises a cassegrain telescope having an input for receiving light from the target and having an output for providing an image responsive to the received light.

5. A method for determining the light spectra of a plurality of locations of a target, the method comprising the steps of:

providing a mask having an array of n rows and n columns of transmissive elements for transmitting light from a plurality of locations of the target, and opaque elements for blocking the light from a plurality of locations of the target, the elements of each row being arranged in a Hadamard pattern, each row having a different cyclic iteration of an m-sequence;

providing a grating for dispersing the transmitted light from the transmissive elements in a linear spatial relationship in a predetermined relationship to the wavelength of the transmitted light;

providing a detector array having a plurality of detector elements arranged in rows and columns, each row of the detector array being arranged to receive the dispersed transmitted light from the grating corresponding to the transmitted light through a row of the mask, each detector element being arranged to receive a different range of wavelengths of the dispersed light from each transmissive element of the corresponding row of the mask and providing an intensity signal indicative of the intensity of the light impinging thereon;

impinging light from the target onto a first row of the mask;

dispersing the light transmitted through the mask in a linear spatial relationship in a predetermined relationship to the wavelength of the transmitted light;

detecting the dispersed light;

translating the mask relative to the target in a direction transverse to the row of the mask; and repeating the impinging, dispersing, detecting, and translating steps until the dispersed light is detected for each row of the mask.

6. The method of claim 5 further comprising the steps of:

generating a data matrix from the detected light for each row of the mask, each row of the data matrix representing data taken from the same source elements and through a corresponding row of the mask; and matrix multiplying the inverse mask pattern matrix by the data matrix to generate a spectrum matrix having elements indicative of the frequency spectrum of each of the plurality of locations of the target, the inverse mask pattern matrix being the result of replacing each 0 of the pattern matrix by −1, taking the transpose, and multiplying by $2/(n+1)$, each element of the mask pattern matrix being a 0 for opaque elements or a 1 for transmissive elements.

* * * * *